S. Merrick
Screw-Blank Feeder
N° 4,411.  Patented Mar. 7, 1846

UNITED STATES PATENT OFFICE.

SOLYMAN MERRICK, OF SPRINGFIELD, MASSACHUSETTS.

FEEDER FOR SCREW-MACHINES.

Specification forming part of Letters Patent No. 4,411, dated March 7, 1846; Reissued May 7, 1850, No. 169.

*To all whom it may concern:*

Be it known that I, SOLYMAN MERRICK, of Springfield, in the county of Hampden and State of Massachusetts, have invented a new and useful apparatus for arranging blanks for screws or pins in vertical positions and delivering them regularly and progressively in such positions to any machinery calculated to receive them and to perform the operations of cutting screws or points upon them, my said apparatus being applicable to many machines used in the manufacture of screws, pins, or various other articles of similar character; and I do hereby declare that the nature of my invention and the manner in which it is constructed and operates are fully described and represented in the following description and accompanying drawings, which, taken in connection, constitute my specification.

Figure 2:
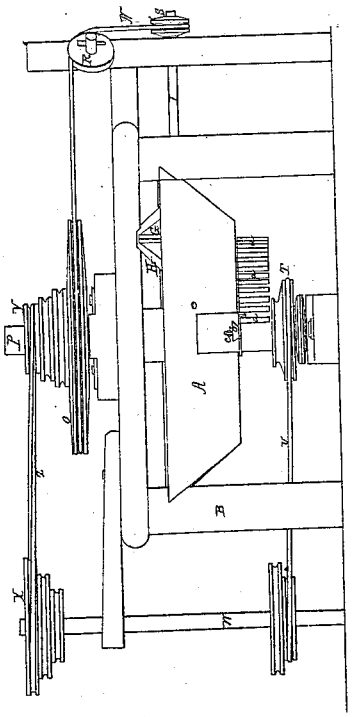
Figure 3:
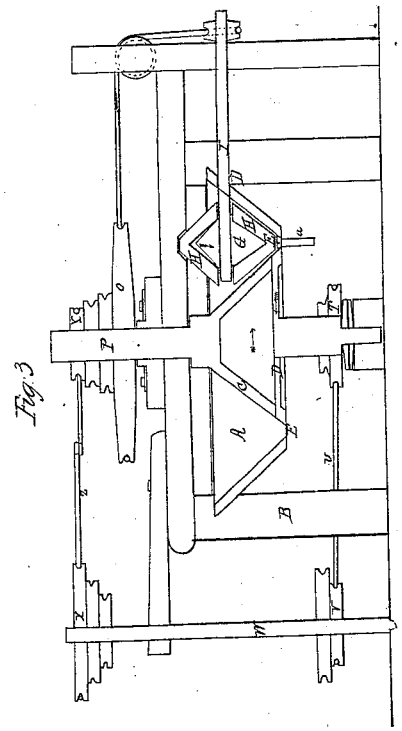
Figure 1:
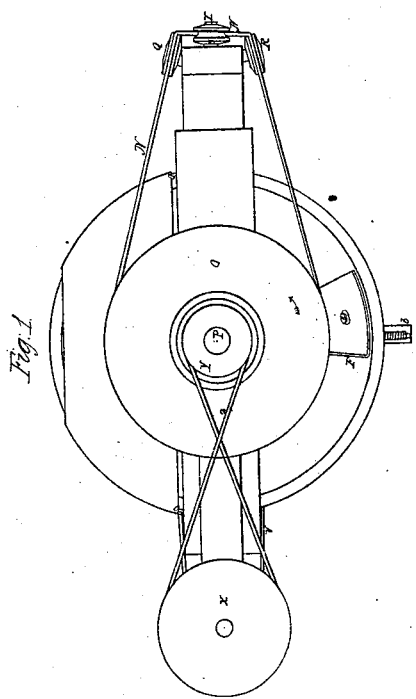
Figure 4:
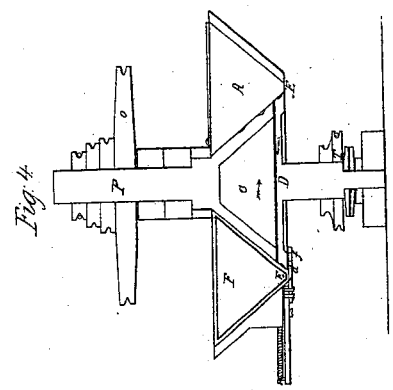

Of the aforementioned drawings Figure 1 denotes a top view, Fig. 2 a front elevation, Fig. 3 a longitudinal vertical and central section, and Fig. 4 a transverse vertical section of the aforesaid apparatus.

In the said drawings A represents a conical hopper sustained in position by a suitable frame work B. Two conic frusta C, D, are disposed within the said hopper and the one over the other and sustained upon shafts or bearings as seen in the drawings. The said conic frusta should revolve in contrary directions as denoted by arrows in the figures. The diameter of the base of the lower frustum is somewhat less than the diameter of the lowest part of the interior of the hopper, there being a circular space E left between them of a width to correspond with the diameter of the shank of each of the screw blanks, and permit them to move freely through it as will be hereinafter described. The exterior surfaces of the two conic frusta should be roughened or indented in such manner as to act upon the screw or pin blanks and cause them to revolve. Generally speaking, the angles of inclination of the exterior edge of the two conic frusta and the interior edge of the hopper with respect to a horizontal plane are to be equal or about equal as denoted in Figs. 3 and 4. Between the inner face of the hopper and the outer faces of the two frusta, I extend a partition F which I secure to the hopper and permit to approach as near as possible toward the frusta and not interfere with their revolving movements, and at a suitable distance from, or on the right of the said partition and between the interior face of the hopper and exterior faces of the frusta, I arrange a revolving beater G. The said beater consists of one or more triangular or other suitably shaped plates H, H applied to a horizontal shaft I extending into the hopper and sustained in bearings at L, M, as represented in the drawings. The said beater may be revolved by an endless band N which may pass around a grooved pulley O placed upon the shaft P of the upper conic frustum, and thence over guide pulleys Q R, and under a small pulley S fixed upon the shaft of the beater. The lower conic frustum should have a pulley T, fixed upon its axis. From the said pulley an endless belt U proceeds to and around a pulley V, fixed upon a vertical shaft W. The said shaft has another pulley X fixed upon its upper end, the said pulley communicating with another one (viz. Y upon the shaft of the upper conic frustum) by a crossed band Z. Instead of the aforesaid modes of giving motion to the several parts any suitable gear work may be adopted.

The screw or other blanks of the kind are to be thrown previously into the hopper on the left hand side of the partition F. As the upper conic frustum C revolves from left to right, and the lower one D from right to left, they will disturb the screw blanks which come in contact with them in such manner as to cause them to successively move downward toward the circular space E before mentioned through which the shanks will fall until arrested in vertical positions by the heads of the blanks coming into contact with the adjacent inclined surfaces of the lower conic frustum and the hopper. As the lower frustum continues to revolve, it will advance each screw blank through the circular space E in the direction in which it (the frustum) travels. The circular space E will thus be filled with screw blanks, whose shanks stand in vertical positions as denoted at *a a*. The object of the beater is to prevent any one of the blanks from overriding the others or disturbing the arrangement of those which may be in that part of the space E which exists on the right of the partition F and between it and the beater. The object of the upper conic frustum is to prevent the blanks from being carried around toward the beater in too great a body. It also facilitates the downward movements of the blanks toward the space E. The triangular plates or arms of the beater, shaped as seen in Fig. 3 revolve in the same direction as does the upper conic frustum. They therefore throw or keep back such blanks as might accumulate to an injurious extent in rear of them.

Figure 5:
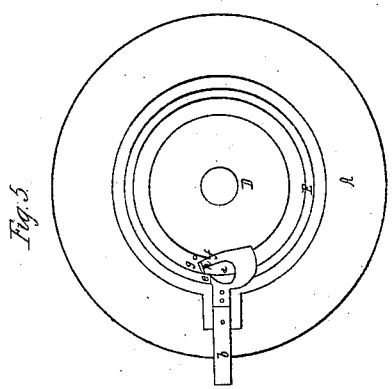

The next part of the apparatus is that by which the blanks are regularly delivered or fed from the circular space E. It consists of a horizontal slide plate $b$ (see Fig. 5 which represents a view of the under sides of the hopper and lower conic frustum D) affixed to the lower edge of the hopper just on the right of the partition F, the said plate being suitably sustained so as to slide toward and from the axis of the lower conic frustum. It is forced inward or toward the same by means of a spring $c$ applied to it and the hopper. The said plate has a circular aperture $d$ cut through one end of it, and a passage $e$ into said aperture cut through the side of the plate, the whole being as seen in the drawings. The inner end of the plate is cam shaped as seen at $f$ so that when a stud $g$ projecting from the under side of the lower frustum is brought into contact with it, it (the stud) shall press the slide outward, or in a direction away from the frustum, and bring the passage $e$ into line or so as to correspond with the circular opening E. When this takes place, the movement of the lower frustum will carry one of the screw blanks through the passage $e$, and cause it to drop out of the machine, the circular aperture $d$ being made larger in its diameter than that of the head of the blank. There is a small stud $h$ fixed upon the rear side of the entrance $c$ of the slide, as seen in the drawing. When the slide is pressed outward, this stud enters between the screw blank which is to be discharged and the one next to it and thereby prevents the escape of the latter. As soon as the blank is discharged the slide plate should be moved inward by its spring. The screw or pin or other blank thus discharged may be received by or into any apparatus calculated to hold or dispose of it for any other operation necessary to be next performed.

Instead of the conical frusta and hopper, I sometimes make use of two or more chain belts arranged parallel to each other and at a proper distance apart, and I apply to them a hopper and beater; but I consider the said chain belts as mechanical equivalents to the aforesaid mechanism by no means so useful or perfect in their operation. The beater may be applied to two cylinders or rollers placed parallel to and apart from each other and provided with a hopper and other contrivances by which the blanks may be dropped between them and advanced toward the beater. In some cases, but one conic fructum may be used in connection with the hopper, in others, a greater number may be necessary according to circumstances.

I therefore claim—

1. The combination of the conical hopper one or two or more conic frusta, a partition and a delivering apparatus arranged and operating together substantially as specified.

2. Also the combination of the revolving beater with the conic hopper and one or more frusta or other mechanical equivalents, the whole being disposed and operating together in the manner and for the purpose as above described.

In testimony whereof, I have hereto set my signature, this eighteenth day of September A. D. 1845.

SOLYMAN MERRICK.

Witnesses:
 HENRY DOSE,
 HOMER FOOT.

[FIRST PRINTED 1913.]